US011399048B2

(12) United States Patent
Huang et al.

(10) Patent No.: US 11,399,048 B2
(45) Date of Patent: Jul. 26, 2022

(54) REMOTE COLLABORATION BASED ON MULTI-MODAL COMMUNICATIONS AND 3D MODEL VISUALIZATION IN A SHARED VIRTUAL WORKSPACE

(71) Applicant: General Electric Company, Schenectady, NY (US)

(72) Inventors: Ching-Ling Huang, San Ramon, CA (US); Yoshifumi Nishida, San Ramon, CA (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 29 days.

(21) Appl. No.: 16/617,381

(22) PCT Filed: May 31, 2017

(86) PCT No.: PCT/US2017/035286
§ 371 (c)(1),
(2) Date: Nov. 26, 2019

(87) PCT Pub. No.: WO2018/222188
PCT Pub. Date: Dec. 6, 2018

(65) Prior Publication Data
US 2021/0126956 A1    Apr. 29, 2021

(51) Int. Cl.
*G06F 15/16*  (2006.01)
*H04L 65/4053*  (2022.01)
*G06T 19/20*  (2011.01)
*H04L 65/401*  (2022.01)
*G06Q 10/10*  (2012.01)

(52) U.S. Cl.
CPC .......... *H04L 65/4053* (2013.01); *G06T 19/20* (2013.01); *H04L 65/4015* (2013.01); *G06Q 10/101* (2013.01)

(58) Field of Classification Search
None
See application file for complete search history.

(56) References Cited

U.S. PATENT DOCUMENTS

2013/0073619 A1    3/2013  Tumuluri
2013/0234934 A1*   9/2013  Champion ............ G06F 3/0304
                                                 345/156
2013/0254281 A1    9/2013  Sun et al.
(Continued)

OTHER PUBLICATIONS

International Search Report of the International Searching Authority for PCT/US2017/035286 dated Jan. 31, 2018.

*Primary Examiner* — Brian Whipple
*Assistant Examiner* — Gregory P Tolchinsky
(74) *Attorney, Agent, or Firm* — Armstrong Teasdale LLP

(57) ABSTRACT

A system, computer-readable medium, and a method including receiving, by a processor, sensor data related to a physical asset; obtaining, by the processor, at least a stored model of the physical asset from a data storage device; generating, by the processor, a visualization representation of the physical asset based on an integration of the sensor data related to the physical asset and the stored model of the physical asset; and presenting, by the processor in a shared virtual workspace accessible by a first user entity and at least one second user entity located remotely from the first user entity, the virtualization representation of the physical asset.

19 Claims, 4 Drawing Sheets

(56) References Cited

U.S. PATENT DOCUMENTS

2014/0233826 A1\* 8/2014 Agaian ................... G06K 9/46
                                                    382/133
2016/0350973 A1\* 12/2016 Shapira .................. G06F 3/017
2017/0132568 A1\* 5/2017 Glunz ................... G06Q 10/101
2018/0336396 A1\* 11/2018 Harrison ............ G06K 9/00577

\* cited by examiner

200

RECEIVE SENSOR DATA RELATED TO A PHYSICAL ASSET
205

OBTAIN AT LEAST A STORED MODEL OF THE PHYSICAL ASSET FROM A DATA STORAGE DEVICE
210

GENERATE A VISUALIZATION REPRESENTATION OF THE PHYSICAL ASSET BASED ON AN INTEGRATION OF THE SENSOR DATA RELATED TO THE PHYSICAL ASSET AND THE STORED MODEL OF THE PHYSICAL ASSET
215

PRESENT, IN A SHARED VIRTUAL WORKSPACE ACCESSIBLE BY A FIRST USER ENTITY AND AT LEAST ONE SECOND USER ENTITY LOCATED REMOTELY FROM THE FIRST USER ENTITY, THE VIRTUALIZATION REPRESENTATION OF THE PHYSICAL ASSET
220

```
┌─────────────────────────────────────────┐
│ CONFIGURE ASSET/ENVIRONMENT TO REPORT SENSOR │
│          DATA TO DATABASE               │
│                                     305 │
└─────────────────────────────────────────┘
                    │
                    ▼
┌─────────────────────────────────────────┐
│ FIELD ENGINEER INTERACTS WITH ASSET TO CAPTURE │
│  DATA RELATED TO THE ASSET/ENVIRONMENT  │
│                                     310 │
└─────────────────────────────────────────┘
                    │
                    ▼
┌─────────────────────────────────────────┐
│  A VISUALIZATINO REPRESENTATION OF THE ASSET/ │
│    ENVIRONMENT IS GENERATED, BASED ON AN      │
│  INTEGRATION OF DATA FROM THE FIELD ENGINEER  │
│    AND THE DATA FROM THE DATABASE, IN         │
│         A SHARED VIRTUAL WORKSPACE            │
│                                     315 │
└─────────────────────────────────────────┘
                    │
                    ▼
┌─────────────────────────────────────────┐
│  REMOTE EXPERT(S) ACCESS THE SHARED VIRTUAL │
│              WORKSPACE                  │
│                                     320 │
└─────────────────────────────────────────┘
                    │
                    ▼
┌─────────────────────────────────────────┐
│    FIELD ENGINEER COLLABORATES WITH THE │
│            REMOTE EXPERT(S)             │
│                                     325 │
└─────────────────────────────────────────┘
```

*FIG. 3*

REMOTE COLLABORATION BASED ON MULTI-MODAL COMMUNICATIONS AND 3D MODEL VISUALIZATION IN A SHARED VIRTUAL WORKSPACE

BACKGROUND

The field of the present disclosure relates generally to remote collaboration, more particularly, to systems, devices and methods of a remote collaboration framework for collaboration between remotely dispersed user entities.

Some traditional systems intended to support communications between parties in different locations are limited. In some systems, the parties might not communicate in real-time. In some other systems, the parties might be limited to viewing the location of one user or the location of another user. For example, a doctor in England might be able to view the operating room in a hospital in America where a doctor is operating on a patient. While this scenario might provide a view within the operating room, the doctor in England may be limited to providing audio comments to the surgeon operating on the patient. Even in the scenario where the surgeon performing the surgery can view the face of the doctor located in England, the scope and level of their interactions are primarily limited to a traditional form of video conferencing.

Therefore, there exists a need for methods and systems that support and facilitate real time interactive collaboration between dispersed user entities.

BRIEF DESCRIPTION

In one aspect, an embodiment of the present disclosure relates to receiving, by a processor, data related to a physical asset; obtaining, by the processor, at least a stored model of the physical asset from a data storage device; generating, by the processor, a visualization representation of the physical asset based on an integration of the data related to the physical asset and the stored model of the physical asset; and presenting, by the processor in a shared virtual workspace (e.g., on Internet, Cloud, enterprise intranet or other network environment) accessible by a first user entity and at least one second user entity located remotely from the first user entity, the virtualization representation of the physical asset. In some aspects, the nature of a remote collaboration herein among a group of users may vary but, in general, may include one or more of remote diagnosis and troubleshooting, conferring and decision-making, real-time field progress supervision, training sessions, other features.

In other embodiments, a system may implement, execute, or embody at least some of the features of the processes herein. In yet another example embodiment, a tangible medium may embody executable instructions that can be executed by a processor-enabled device or system to implement at least some aspects of the processes of the present disclosure.

DRAWINGS

These and other features, aspects, and advantages of the present disclosure will become better understood when the following detailed description is read with reference to the accompanying drawings in which like characters represent like parts throughout the drawings, wherein:

FIG. 2 is an illustrative example flow diagram of a process, according to some embodiments herein;

FIG. 3 is an illustrative example flow diagram of a process, according to some embodiments herein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Figure 1:
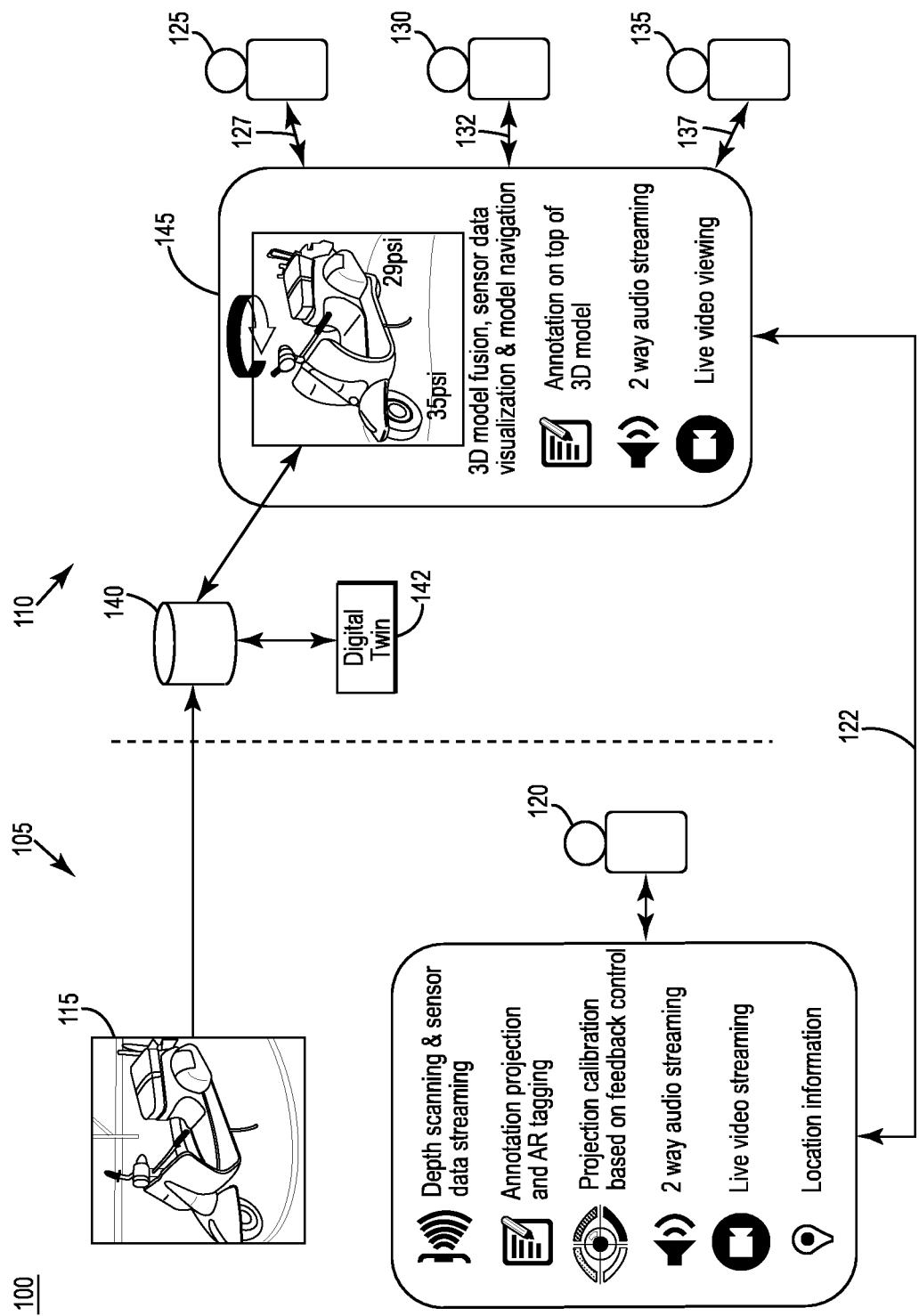
FIG. 1 is an illustrative example of a system framework diagram depicting some aspects of an embodiment herein.

FIG. 1 is an illustrative example of a system framework 100 that may support some of the aspects disclosed herein. Namely, framework 100 supports, facilitates, and provides a mechanism for remote sensor data capturing, management of a database asset model, visualization of an asset's status, and multi-modal communications among users as disclosed herein (greater detail below). The multi-modal communications may include, for example, annotations on a model by collaborating experts and augmented reality projections to asset a first user collaborating with the experts. Features, aspects, and embodiments of the present disclosure are not however limited to framework 100. Framework 100 includes, in general, a field location 100 containing a physical asset 115 and a remote location 110 is that is, generally, at least partially isolated in space from the field location. A first user entity 120 (e.g., a field engineer, a product owner, etc.) may be co-located with physical asset 115 in the field location 105. The remote location 110 may contain at least one of a second user entity 125, 130, and 135. The second user entities 125, 130, and 135 (e.g., remote experts) may each be knowledgeable of at least some aspects of the physical asset 115, including but not limited to its functionality and operational capabilities, its repair procedures, maintenance, and other aspects thereof.

System framework 100 further includes a data storage device 140. In some embodiments, data storage device 140 may be an instance of a database, including a server. The database 140 may be centrally configured or a distributed database system including a plurality of nodes. In some aspects, the database system may comprise involatile memory (e.g., hard/fixed disks, solid state memory devices, etc.), volatile memory (e.g., random access memory), and combinations thereof.

In some aspects, physical asset 115 may be equipped with one or more sensors or positioned in the vicinity of one or more sensors such that data related to a status of the asset and/or the environment in the vicinity of the asset can be gathered by such sensors. The data or information obtained by the sensors (not shown in FIG. 1) may be reported or otherwise transmitted to data storage device 140. A stored record of the sensor data concerning asset 115 may be retrieved for further processing, analysis, and reporting purposes. Storage device 140 (e.g., a database) may further store records or files of processed sensor data, including analytics based thereon.

In some aspects, data device 140 may store record(s) of a model of the asset 115. In some embodiments, the model might include a three-dimensional, 3D, model of an asset, particularly in the instance asset 115 is a physical asset. In the event that asset 115 is an environment, the model might include one or more behavioral and/or predictive scenarios for the environment. In some embodiments, the model might include a "digital twin" 142 of asset 115, wherein the digital twin includes mathematical-based and realistically accurate operational characteristics for the asset. This "digital twin" refers to the concept of computerized companions of physical assets, which can be an up-to-date virtual representation of the physical assets, based on statistical/mathematical and/or physical models to predict or forecast the behavior of the physical asset. Digital twin 142 may be hosted in a server or as a service with access to historical data of the asset (e.g., a database storing and managing such historical data).

To address issue(s) of model accuracy for a specific asset (i.e., a particular piece of equipment), a parametric modeling approach might be used to allow tuning of the model using previously recorded and/or streamed data during real world operations from the particular asset 115. In some aspects, the digital twin 142 might leverage an accurate model of subsystem(s) of the subject asset 115 (e.g., an engine) installed in the specific asset for accurate performance model parameters of the sub-system that might contribute to a more accurate overall model of asset 115. The digital twin 142 might also leverage some form of data analytics capabilities with data recorded from asset 115 for tuning parameters of the model. In the example of FIG. 2, digital twin 142 corresponds to the specific asset 115. In some embodiments, a database (or other storage facility) might include multiple digital twins corresponding to a plurality of physical assets, such as, for example, different assets in an organization's catalog of products.

In some aspects, framework 100 may support and facilitate a collaborative remote working interaction and/or relationship between first user entity 120 located with asset 115 and at least one second user entity 125, 130, and 135 located remotely from the asset and the first user entity 120. To effectuate remote collaboration, framework 100 can include a shared virtual workspace (SVW) 145. In some embodiments, SVW 145 may be implemented in a server (i.e., server-side application or service), as a cloud-based service supported by a back-end system (not shown in FIG. 1), a client-side application, and other configurations. In the depicted configuration of FIG. 1, SVW includes a cloud-based service that is accessible to both the first user entity 120 and the at least one second user entity 125, 130, and 135. Access to SVW by one or both of the first user entity 120 and the second user entities 125, 130, and 135 may be managed based on one or more security policies, where a security policy might be based on a role of the first user entity and the second user entities.

As shown, first user entity 120 might communicate one or more different types of data to SVW 145 via communication link 122 and the at least one second user entity 125, 130, and 135 might communicate one or more different types of data to SVW 145 via communication links 127, 132, and 137, respectively.

In some instances, first user entity 120 might possess different types and modes of data acquisition and sensor technologies. For example, first user entity 120 might have technology (e.g., wearable, handheld, portable, etc.) having functionalities including but not limited to, 3D depth scanning and sensor data streaming, annotation projection and augmented reality (AR) tagging, projection calibration based on feedback control(s), 2-way (bi-directional) audio streaming, live video streaming, and asset/first user entity location information (e.g., latitude and longitude coordinates, etc.) determination and reporting. The one or more types of data acquired by the first user entity by the one or more types of technologies (either now known or those that become known in the future) can be communicated to SVW 145 via communication link 122 between location 105 and SVW 145. In some embodiments, first user entity 120 may send, directly or indirectly, data related to asset 115 to SVW 145 that includes, for example, live depth sensing (i.e., 3D model) streaming data, live video streaming data (e.g., high definition or "4K" resolution), live audio streams, location data (e.g., Global Positioning System (GPS) data, indoor positioning information from either a private or public system, third-party location mapping (e.g., Google Earth or Google Map information, etc.) and combinations thereof.

In some embodiments, one or more of the second user entities 125, 130, and 135 might send files, records, and data streams to SVW 145. The files, records, and data streams might include annotations to be added to, appended to, or superimposed on a model (e.g., a 3D model) retrieved from data storage device 140; audio commentary; and live video streams of the second user entity and/or their immediate vicinity. The data sent from the one or more second user entities 125, 130, and 135 may be forwarded or otherwise sent to the first user entity 120 via SVW 145 and communication link 122. As such, live and/or previously recorded annotations on a 3D model (including, for example, a 3D model resulting from the fusion of a model from data storage device 140 and sensed data of asset 115 from location 105 by a processor of the SVW 145) and live or previously recorded audio streaming data might be transmitted from the SVW to the location 105 where such information can be received and used by the first user entity 120.

In some embodiments, communication link 122 may be a single communication link handling two-way communications, separate communication channels each handling one-way communication traffic, and wired or wireless communications over a combination of private and/or public communication infrastructure(s) and networks.

FIG. 2 is an illustrative depiction of a process 200, in some embodiments herein. In some instances, process 200 may relate to a remote collaborative and shared workspace. In some aspects, process 200 may be implemented, supported, and/or facilitated by a system framework such as framework 100 in FIG. 1. However, process 200 is not limited to framework 100.

At operation 205, data related to a physical asset is received. Referring to framework 100, the data may be received from one or more technologies deployed by or on the first user entity in location 105 with the asset. In some embodiments, the technologies may be embodied as wearables worn on the body of the first user entity. The particular implementation(s) of the wearables might be in the form of eyewear, headgear, gloves, other articles of clothing, and any device or system affixed to or supported by the body of the first user entity.

At operation 210, data of (at least) a stored model is received from a data storage device (e.g., database 140). The stored model may be based on (e.g., constructed or derived from) data received from one or more sensors embedded, integrated, or interfaced with the subject asset. In some embodiments, the model may be provided by an original equipment manufacturer of the subject asset. In some instances, the model might be obtained from a third-party provider. In some embodiments, the model includes a 3D model accurately representing relevant characteristics of the subject asset.

Continuing to operation 215, a visualization representation of the physical asset is generated. The generated visualization may be based on a fusion or integration of the asset related data received from the first user entity at operation 205 and the stored model of the physical asset obtained at operation 210. In some embodiments, the fusion or integration of the data from operations 205 and 210 may be performed by a shared virtual workspace, including the systems and devices comprising the SVW such as, for example, a server, one or more processors, and backend systems that might include a database, a memory, and one or more processors.

At operation 220, the generated visualization representation of the asset (whether a physical asset or an environment) may be presented in the SVW, wherein the visualization is accessible by the first user entity and at least one of a second user entity (e.g., user entities 125, 130, and 130 in FIG. 1). Access herein may include the viewing, manipulation (e.g., rotating, enlarging, zooming in/zooming out, coloring, saving a record of, etc.) of the visualized representation of the asset.

In some instances, the first user entity and at least one of a second user entity might both access the visualized representation of the asset simultaneously. In this manner, the different parties, although located in separate physical spaces, may collaborate together regarding a same visualized representation of a particular asset. Accordingly, the SVW disclosed herein provides, in some aspects, a technological tool and solution of remote collaboration between multiple parties, wherein the collaboration can occur in real time. If real time collaboration is not possible or desired, audio/video commentary, suggestions, notes, and annotations left in the SVW can be archived and accessed at a later time to, for example, assist the different user entities.

In some embodiments, the integrated model may be annotated with text-based comments and/or markings generated by the second user entities via the SVW. The annotations might appear as overlays on the fusion model. In some embodiments, the annotations might be included in a separate visualization or record. In some instances, the annotations may be generated in the SVW in response to commands and instructions of the second user entities and further be transmitted to the field location 105 where they might be projected onto the real-world physical asset (via, for example, a mini-projector). In this manner, the annotations might be projected onto the physical asset as they might appear in the SVW overlaid on the model fusion. The model fusion including annotations presented in the SVW might be replicated in the real world where, for example, the first user might experience a first-hand view of the annotations on the actual asset.

FIG. 3 is a flow diagram 300 of a use-case for some aspects of the present disclosure. In some embodiments, flow diagram 300 relates to a scenario wherein a field engineer (FE) is deployed in a field location with a particular physical asset and requests assistance in diagnosing a problem experienced by the asset from a plurality of remote experts (RE's) that are each located in location remote from the field location. In some instances, the RE's might be located together in one location or different and distinct locations.

At operation 305, the field location is configured to report sensor data relating to an asset/environment to a data storage facility. In some aspects, the data storage facility might include a cloud server including a storage memory device. In some instances, some prior knowledge of the asset/environment, such as a 3D model, a product catalog or specification sheet, additional analytics, etc. may be stored in the data storage facility.

At operation 310, the FE might interact with the asset/environment to capture data related thereto. In some instances, the data captured here might be obtained via one or more devices and technologies including but not limited to wearables on the person of the FE. However, not all (or even any) of the data captured in operation 310 need be captured by a wearable device.

Continuing to operation 315, a SVW generates a 3D fusion model visualization representation of the asset/environment based on an integration, combination, or fusion of the data captured by the FE and the 3D model from the data store (e.g., database) based on the sensed data. In some aspects, the visualization representation of the fusion model might include additional information such as, for example, analytics generated by the SVW based on the sensed data, annotations from the FE's, and other information from third-parties.

At operation 320, the RE's might access the SVW. The RE's might access the SVW in response to an invitation or other indication invoked by an action of the FE and/or the asset/environment. For example, a problem at the asset/environment might direct the FE to contact one or more RE's based on their knowledge and expertise. The RE's, upon accessing the SVW, might perform a number of actions, including but not limited to, comparing the cached/saved 3D model with depth sensing data streamed to the SVW by the FE, annotating the 3D model with text and/or other markings to guide the FE in a task, viewing image (still or video) streamed (live or saved) from the FE, and speaking with the FE via two-way audio exchanges.

At operation 325, the FE might participate in the collaboration via the SVW by, for example accessing the SVW and receiving the RE's annotations and projecting them onto the asset/environment. In some instances, the projections might include augmented reality tagging. In some embodiments, the FE might be able to move relative to the asset and still have the RE's annotations remain in a proper and accurate position relative to the asset/environment. In some instances, computer vision algorithms and other techniques might be used to calibrate, align, and adjust the positioning of the projected annotations via a feedback loop such as, for example, a live RGB camera view. In some embodiments, the FE might communicate with the RE's via a two-way audio exchange, either alone or in conjunction with the transfer and viewing of annotations.

Figure 4:
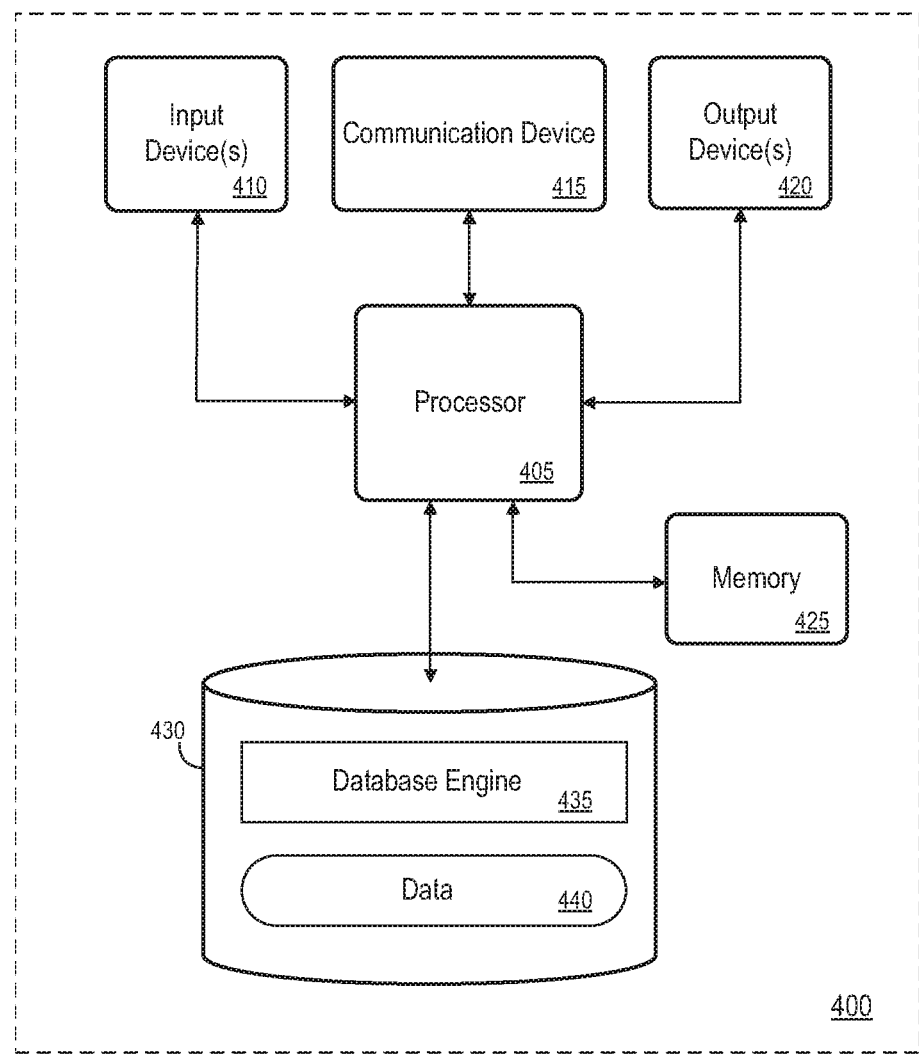
FIG. 4 is an illustrative depiction of a block diagram of a system or device that can support some processes disclosed herein.

In some embodiments, the nature of the remote collaboration between entities herein may vary depending, for example, on the industries and contexts of the collaboration. One example scenario might include the collaboration between a field technician and remote experts working together to diagnose an asset's problem. At least part of the remote collaboration may include one or more of the remote experts instructing the field technician to measure additional sensor readings or other measurable quantities and/or to inspect specific parts of the asset to further diagnose the problem. Another illustrative collaboration may include a conferring and decision-making process, where a field technician presents sensor data and/or observations in the field to the SVW, confers with at least one remote expert in the SVW, determines (via joint/collaborative decision) a repair/maintenance/shutdown recommendation, and then acts in accordance with the determination. As this example including remote collaboration and a SVW disclosed herein highlights, the at least one remote expert (i.e., the second one or more users) need not be physically present in the field with the asset and field technician (i.e., first user) in a conferring process herein In some instances, a collaboration herein might encompass real-time field work supervision and monitoring. For example, remote experts may remotely monitor how a field technician performs tasks on a critical asset and confirm their compliance to prescribed procedures, on a step-by-step basis, for regulatory, reporting, and other purposes. In yet another example embodiment of remote collaboration, real-time training sessions might be facilitated and supported by the present disclosure. For example, an expert in the field might demonstrate one or more training procedures to a group of remotely located trainees. The training procedures, session notes, and session discussions related to the training sessions can be facilitated and archived in a SVW herein FIG. 4 is an illustrative block diagram of apparatus 400 according to one example of some embodiments. Apparatus 400 may comprise a computing apparatus and may execute program instructions to perform any of the functions described herein. Apparatus 400 may comprise an implementation of server, a dedicated processor-enabled device, a user entity device, and other systems, including a cloud server embodiment of at least parts of a SVW disclosed herein. Apparatus 400 may include other unshown elements according to some embodiments.

Apparatus 400 includes processor 405 operatively coupled to communication device 415 to communicate with other systems, data storage device 430, one or more input devices 410 to receive inputs from other systems and entities, one or more output devices 420 and memory 425. Communication device 415 may facilitate communication with other systems and components, such as other external computational assets and data. Input device(s) 410 may comprise, for example, a keyboard, a keypad, a mouse or other pointing device, a microphone, knob or a switch, an infra-red (IR) port, a docking station, and/or a touch screen. Input device(s) 410 may be used, for example, to enter information into apparatus 400. Output device(s) 420 may comprise, for example, a display (e.g., a display screen) a speaker, and/or a printer.

Data storage device 430 may comprise any appropriate persistent storage device, including combinations of magnetic storage devices (e.g., magnetic tape, hard disk drives and flash memory), solid state storages device, optical storage devices, Read Only Memory (ROM) devices, Random Access Memory (RAM), Storage Class Memory (SCM) or any other fast-access memory. Data storage device 430 might store 2D models, asset specifications, and asset analytics.

Database engine 435 may comprise program instructions executed by processor 405 to cause apparatus 400 to perform any one or more of the processes described herein, including but not limited to aspects disclosed in FIGS. 2 and 3. Embodiments are not limited to execution of these processes by a single apparatus.

Data 440 (either cached or a full database) may be stored in volatile memory such as memory 425. Data storage device 430 may also store data and other program code for providing additional functionality and/or which are necessary for operation of apparatus 400, such as device drivers, operating system files, etc. Data 450 may include data related an asset that may be used in the generation of a 3D model and/or a fusion or integrated model.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed includes:

1. A method, implemented by a processor, the method comprising:
  receiving, by a processor, sensor data from at least one sensor embedded with a physical asset;
  obtaining, by the processor, at least a stored model of the physical asset from a data storage device;
  generating, by the processor, a visualization representation of the physical asset based on an integration of the sensor data related to the physical asset and the stored model of the physical asset;
  presenting, by the processor in a shared virtual workspace accessible by a first user entity and at least one second user entity located remotely from the first user entity, the virtualization representation of the physical asset;
  receiving, by the processor, expert data from one or more of the at least one second user entities;
  presenting, by the processor in the shared virtual workspace, the received expert data;
  receiving, by the processor in the virtual workspace, collaborative inputs from the first user entity in response to the presented expert data;
  determining, based at least in part on at least one of the received expert data and the collaborative inputs, a course of action for the physical asset;
  invoking the determined course of action for the physical asset, by directing the first user to perform one or more tasks; and
  in response to invoking the determined course of action, confirming compliance to the determined course of action by confirming that the first user performed the one or more tasks, by receiving, by the processor, sensor data from at least one sensor embedded with the physical asset.

2. The method of claim 1, wherein the first user entity is co-located with the physical asset.

3. The method of claim 1, wherein the sensor data includes at least one of a photograph, a video, a three-dimensional photograph, a three-dimensional video, audio data, and geo-location data of the physical asset; an environmental status in a vicinity of the physical asset; and combinations thereof.

4. The method of claim 1, wherein the data storage device is an instance of a database.

5. The method of claim 1, wherein the expert data includes at least one of text-based annotations appended to the stored model of the physical asset, annotations to be projected on the physical asset, audio data, and video related to the physical asset.

6. The method of claim 1, wherein the expert data is generated by the at least one second user entity.

7. The method of claim 1, further comprising receiving an indication of at least one of the first user entity and the at least one second user entity manipulating the visualization representation of the physical asset within the shared virtual workspace.

8. The method of claim 7, wherein the first user entity and the at least one second user entity concurrently access and view the other in the shared virtual workspace.

9. A system comprising:
a memory storing processor-executable program instructions; and
a processor to execute the processor-executable program instructions to:
receive sensor data from at least one sensor embedded with a physical asset;
obtain at least a stored model of the physical asset from a data storage device;
generate a visualization representation of the physical asset based on an integration of the sensor data related to the physical asset and the stored model of the physical asset;
present, in a shared virtual workspace accessible by a first user entity and at least one second user entity located remotely from the first user entity, the virtualization representation of the physical asset;
receiving, by the processor, expert data from one or more of the at least one second user entities;
presenting, by the processor in the shared virtual workspace, the received expert data;
receiving, by the processor in the virtual workspace, collaborative inputs from the first user entity in response to the presented expert data;
determining, based at least in part on at least one of the received expert data and the collaborative inputs, a course of action for the physical asset;
invoking the determined course of action for the physical asset, by directing the first user to perform one or more tasks; and
in response to invoking the determined course of action, confirming compliance to the determined course of action by confirming that the first user performed the one or more tasks by receiving, by the processor, sensor data from at least one sensor embedded with the physical asset.

10. The system of claim 9, wherein the first user entity is co-located with the physical asset.

11. The system of claim 9, wherein the sensor data includes at least one of a photograph, a video, a three-dimensional photograph, a three-dimensional video, audio data, and geo-location data of the physical asset; an environmental status in a vicinity of the physical asset; and combinations thereof.

12. The system of claim 9, wherein the data storage device is an instance of a database.

13. The system of claim 9, the expert data includes at least one of text-based annotations appended to the stored model of the physical asset, annotations to be projected on the physical asset, audio data, and video related to the physical asset.

14. The system of claim 13, wherein the processor is further enabled to execute the processor-executable program instructions to:
determine, based at least in part on at least one of the received expert data and the collaborative inputs, a course of action for the physical asset; and
invoke the determined course of action for the physical asset.

15. The system of claim 9, wherein the expert data is generated by the at least one second user entity.

16. The system of claim 9, wherein the processor is further enabled to execute the processor-executable program instructions to receive an indication of at least one of the first user entity and the at least one second user entity manipulating the visualization representation of the physical asset within the shared virtual workspace.

17. The system of claim 16, wherein the first user entity and the at least one second user entity concurrently access and view the other in the shared virtual workspace.

18. A non-transitory computer-readable medium having processor-executable program instructions stored thereon, the medium comprising:
program instructions to receive sensor data from at least one sensor embedded with a physical asset;
program instructions to obtain at least a stored model of the physical asset from a data storage device;
program instructions to generate a visualization representation of the physical asset based on an integration of the sensor data related to the physical asset and the stored model of the physical asset; and program instructions to present in a shared virtual workspace accessible by a first user entity and at least one second user entity located remotely from the first user entity, the virtualization representation of the physical asset;
receiving, expert data from one or more of the at least one second user entities;
presenting in the shared virtual workspace, the received expert data;
receiving in the virtual workspace, collaborative inputs from the first user entity in response to the presented expert data;
determining, based at least in part on at least one of the received expert data and the collaborative inputs, a course of action for the physical asset;
invoking the determined course of action for the physical asset, by directing the first user to perform one or more tasks; and
in response to invoking the determined course of action, confirming compliance to the determined course of action by confirming that the first user performed the one or more tasks, by receiving, by the processor, sensor data from at least one sensor embedded with the physical asset.

19. The non-transitory computer-readable medium of claim 18,
wherein the expert data includes at least one of text-based annotations appended to the stored model of the physical asset, annotations to be projected on the physical asset, audio data, and video related to the physical asset.

* * * * *